UNITED STATES PATENT OFFICE.

ISADOR LADOFF, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRODE.

1,189,265.      Specification of Letters Patent.      Patented July 4, 1916.

No Drawing.      Application filed July 19, 1913. Serial No. 780,031.

*To all whom it may concern:*

Be it known that I, ISADOR LADOFF, a citizen of the United States, and a resident of Wilkinsburg, in the county of Allegheny and State of Pennsylvania, have invented a new and useful Improvement in Electrodes, of which the following is a specification.

My invention relates to arc lighting, and it has particular reference to the composition of electrodes by means of which a flaming arc giving a substantially white light may be produced.

My invention is an improvement upon the so-called flaming arc electrodes of the type composed preponderatingly of carbon but containing also various substances to increase the candle-power efficiency, the steadiness, and the quality of the emitted light. The association of certain substances with carbon imparts to the resulting arc, the flaming characteristics which distinguish electrodes composed principally of metallic substances from those composed principally of carbon.

Heretofore various compounds of a metallic character have been associated with the constituent carbon which, though increasing the intensity of the emittted light from the arc, have proven unsatisfactory because of the objectionable color values imparted to the arc, and because of the intermittent changes of color and the flickering of the light emitted from the arc. For example, the titanium compound found most serviceable for producing an efficient and white arc, produces, at the same time, a very unsteady arc which causes objectionable variations in the light emitted therefrom. Again, this unsteadiness is accentuated by the fact that a titanium carbid arc is long, thin and weak, therefore making the arc especially liable to rupture which causes a premature feeding operation of the lamp. Another objection to the titanium carbid arc is that the amount of light emitted therefrom often decreases very much in value after the lamp has been in operation for a time.

To strengthen the arc and to increase its stability, fluorin, as an acid-forming constituent in a metallic compound, has been associated with the titanium carbid. At the same time, the metallic constituent enlarges or fattens the arc, thus increasing its conductivity. The usual fluorin compound introduced for overcoming the objectionable features above-mentioned, is calcium fluorid, the calcium constituent increasing the intensity of the light but giving a reddish color to the arc, especially when the arc voltage drops below a certain minimum value, which is unavoidable in commercial installations. Electrodes comprising titanium carbid and fluorin in a metallic compound, as above mentioned, are not wholly satisfactory because the flaming arc produced thereby is characterized by some undesirable flickering, and also objectionable color values.

One object of my invention is to provide means whereby mineralized carbon electrodes may, without impairing their operativeness on alternating current, produce more efficient, steadier and whiter arcs than heretofore.

I have discovered that certain chemical compounds of titanium in combination with certain substances, namely, metals which give a substantially white light in an electric arc, possess properties, when incorporated with carbon electrodes, by means of which the objects of my invention are realized.

Because titanium carbid, even when associated with fluorin as an acid constituent in a metallic compound, for example, calcium fluorid, produces an unsteady arc, I have substituted titanium oxid for the titanium carbid, the titanium oxid imparting a violet blue tinge to the arc which is the characteristic color of titanium oxid when burning in an electric arc. As a substitute for the usual calcium fluorid, I use sodium fluorid which increases the conductivity of the arc and adds no objectionable color value to the light emitted from the arc. Of the substances which, when associated with titanium oxid and sodium fluorid, impart an intense white light to the arc, barium compounds are the most efficient. In a very satisfactory electrode which I have made in accordance with my invention, I used barium fluorid, the fluorin being introduced in this manner so as to increase the stability of the titanium oxid arc.

It is essential, inasmuch as the compounds mentioned are more or less refractory, to associate therewith in the electrode an additional substance or substances primarily for the purpose of acting as a flux or fluxes during arcing. Such substances should be selected with a view to their imparting the least possible undesirable color or of dimness to the arc. I have found cerium fluorid in combination with thorium nitrid suitable for this purpose. The cerium and thorium, in combination with the other elements in the electrode, impart a brilliant white color to the arc, thus improving greatly the color value of the light emitted from the arc. Cerium alone imparts a brilliant greenish color when burning in the arc. The use of the above-mentioned fluxes is generally preferable because, as aforesaid, they give a substantially white light to the arc and increase its intensity, besides performing satisfactorily their functions as fluxes.

Inasmuch as the extent and the nature of the fluxes referred to may be more or less varied, according to circumstances, it is impossible to predicate any definite rules for their use which, within the above-mentioned limits, will be readily determined by those skilled in the art without further information than is hereinbefore disclosed and is afforded by the example of the proportions hereinafter to be given.

I have made an excellent electrode by using, as the substance which imparts the flaming characteristics to the carbon electrode, the following combination, the proportion of the constituents being sodium fluorid (NaF) 21%; titanium oxid (TiO$_2$) 12%; barium fluorid (BaF$_2$) 45%; cerium fluorid (CeF$_2$) 20%, and thorium nitrid (ThN$_3$) 2%. These compounds are thoroughly mixed in powdered form. A portion of this mixture, which is equivalent to 30% of the whole electrode, is added to 70% of powdered coke or carbon in combination with a suitable binder. The subsequent operations for making the electrodes, proceed in the usual manner which is well known in the art.

While I have described my invention as particularly applicable to electrodes in which titanium oxid associated with barium fluorid is present, it is to be understood that I am not limited to barium fluorids or to any barium compounds, as I have found that titanium oxid, in combination with other minerals or compounds thereof, for example, magnesium borate, produces electrodes by means of which a white light of excellent quality may be obtained from the arc associated with the said electrodes.

I claim as my invention:

1. An arc light electrode comprising titanium oxid, fluorin chemically combined with barium and a flux which itself gives a white light in the arc.

2. An arc light electrode comprising titanium oxid, a barium compound which itself gives a substantially white light in the arc, and a flux which also gives a white light in the arc.

3. An arc light electrode comprising titanium oxid, a mineral which itself gives a substantially white light in the arc, and a flux consisting of a cerium compound and a thorium compound.

4. An arc light electrode comprising titanium oxid, a mineral compound which itself gives a substantially white light in the arc, and a flux consisting of a cerium compound and a thorium compound.

5. An arc light electrode comprising titanic material, sodium fluorid and a mineral compound which itself gives a substantially white light in the arc.

6. An arc light electrode comprising titanic material, sodium fluorid, a barium compound and a fluxing agent.

7. An arc light electrode comprising titanic material, sodium fluorid, barium and a fluxing agent.

8. An arc light electrode comprising titanic material, sodium fluorid, a mineral which itself gives a substantially white light in the arc, a cerium compound, and a thorium compound.

9. An arc light electrode comprising titanic material, sodium fluorid, a barium compound, a cerium compound, and a thorium compound.

10. An arc light electrode comprising a mixture containing about 21% of sodium fluorid, about 12% of titanium dioxid, about 45% of barium fluorid, about 20% of cerium fluorid and about 2% of thorium nitrid.

11. An arc light electrode consisting of about 70 parts of carbon, a binder, and about 30 parts of a mixture containing about 21% of sodium fluorid, about 12% of titanium dioxid, about 45% of barium fluorid, about 20% of cerium fluorid and about 2% of thorium nitrid.

In testimony whereof, I have hereunto subscribed my name this 15th day of July, 1913.

ISADOR LADOFF.

Witnesses:
RAY P. JACKSON,
B. B. HINES.